(12) United States Patent
Huber et al.

(10) Patent No.: US 11,986,995 B2
(45) Date of Patent: May 21, 2024

(54) METHODS FOR THE ADDITIVE MANUFACTURE OF COMPONENTS IN LAYERS, AND CORRESPONDING COMPUTER PROGRAM PRODUCTS

(71) Applicant: TRUMPF Laser- und Systemtechnik GmbH, Ditzingen (DE)

(72) Inventors: Uwe Huber, Ingersheim (DE); Johannes Bauer, Illingen (DE); Michael Thielmann, Vaihingen an der Enz (DE); Joachim Wagner, Stuttgart (DE); Jürgen Ortmann, Attendorn (DE); Matthias Allenberg-Rabe, Stuttgart (DE); Detlef Breitling, Leonberg (DE); Damien Buchbinder, Berlin (DE); Florian Krist, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 180 days.

(21) Appl. No.: 16/407,389

(22) Filed: May 9, 2019

(65) Prior Publication Data
US 2019/0263065 A1 Aug. 29, 2019

Related U.S. Application Data

(63) Continuation of application No. PCT/EP2017/078118, filed on Nov. 3, 2017.

(30) Foreign Application Priority Data

Nov. 14, 2016 (DE) .......................... 102016222261.9

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/36* (2021.01); *B22F 10/366* (2021.01);
(Continued)

(58) Field of Classification Search
CPC ... B29C 64/268; B29C 64/153; B29C 64/393; B29C 64/277; B29C 33/38; B29C 41/02;
(Continued)

(56) References Cited

U.S. PATENT DOCUMENTS 5,352,405 A * 10/1994 Beaman ............. G05B 19/4099
419/45
5,536,467 A * 7/1996 Reichle .................. G02B 26/10
118/712
(Continued)

FOREIGN PATENT DOCUMENTS

CN 105555509 3/2018
CN 105873698 1/2020
(Continued)

OTHER PUBLICATIONS

DE Office Action in German Appln. No. 2011-507600, dated Aug. 9, 2017, 12 pages (with English translation).
(Continued)

*Primary Examiner* — Christopher M Rodd
*Assistant Examiner* — Shibin Liang
(74) *Attorney, Agent, or Firm* — Fish & Richardson P.C.

(57) ABSTRACT

The disclosure provides methods of additive manufacture of components in layers in a powder bed by at least two laser beams that can be deflected two-dimensionally over the same powder bed region. Each laser focal spot is projected onto the power bed and is or is set to a diameter of less than or equal to 300 μm. Components to be produced in the powder bed region are manufactured by each of the laser
(Continued)

beams, and each individual surface contour of the component is manufactured solely by one of the laser beams.

15 Claims, 1 Drawing Sheet

(51) Int. Cl.
| | |
|---|---|
| *B22F 10/36* | (2021.01) |
| *B22F 10/366* | (2021.01) |
| *B22F 12/45* | (2021.01) |
| *B28B 1/00* | (2006.01) |
| *B28B 17/00* | (2006.01) |
| *B29C 64/268* | (2017.01) |
| *B29C 64/277* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B22F 12/49* | (2021.01) |

(52) U.S. Cl.
CPC .............. *B22F 12/45* (2021.01); *B28B 1/001* (2013.01); *B28B 17/0081* (2013.01); *B29C 64/268* (2017.08); *B29C 64/277* (2017.08); *B29C 64/393* (2017.08); *B33Y 10/00* (2014.12); *B33Y 30/00* (2014.12); *B33Y 50/02* (2014.12); *B22F 12/49* (2021.01); *Y02P 10/25* (2015.11)

(58) Field of Classification Search
CPC ......... B29C 35/08; B29C 41/52; B33Y 10/00; B33Y 30/00; B33Y 50/02; B22F 12/00; B22F 10/10; B22F 3/1055; B22F 3/003; B22F 3/00; B22F 3/105; B28B 1/001; B28B 17/0081; Y02P 10/25
See application file for complete search history.

(56) References Cited

U.S. PATENT DOCUMENTS

| | | | | |
|---|---|---|---|---|
| 5,985,204 | A | * | 11/1999 | Otsuka .................. B23K 26/34 |
| | | | | 264/497 |
| 10,427,348 | B2 | | 10/2019 | Perez et al. |
| 2012/0237745 | A1 | | 9/2012 | Dierkes et al. |
| 2013/0112672 | A1 | | 5/2013 | Keremes et al. |
| 2015/0125333 | A1 | * | 5/2015 | Bruck .................. B23K 26/127 |
| | | | | 419/1 |
| 2015/0165524 | A1 | | 6/2015 | Ljungblad et al. |
| 2016/0318129 | A1 | | 11/2016 | Hu |

FOREIGN PATENT DOCUMENTS

| | | |
|---|---|---|
| DE | 4302418 | 8/1994 |
| DE | 19818469 | 10/1998 |
| DE | 19953000 | 5/2001 |
| DE | 102005014483 | 10/2006 |
| DE | 102013103006 | 10/2013 |
| DE | 102015103127 | 9/2016 |
| EP | 2875897 | 5/2015 |
| EP | 3538293 | 9/2019 |
| WO | WO 2014/210338 | 12/2014 |
| WO | WO 2015/091498 | 6/2015 |
| WO | WO 2015/191257 | 12/2015 |
| WO | WO 2016/077250 | 5/2016 |
| WO | WO 2018086991 | 5/2018 |

OTHER PUBLICATIONS

PCT International Preliminary Report on Patentability in International Appln. No. PCT/EP2017/078118, dated May 14, 2018, 7 pages.
PCT International Search Report and Written Opinion in International Appln. No. PCT/EP2017/078118, dated Jan. 2, 2018, 20 pages.
CN Office Action in Chinese Appln. No. 201780070333.3., dated Nov. 13, 2020, 6 pages (English translation).
EP Notice of Opposition in European Appln. No. 17793939.4, dated Apr. 18, 2023, 137 pages (with English translation).

* cited by examiner ium. By the multiple overlapping laser beams, a larger
METHODS FOR THE ADDITIVE MANUFACTURE OF COMPONENTS IN LAYERS, AND CORRESPONDING COMPUTER PROGRAM PRODUCTS

CROSS REFERENCE TO RELATED APPLICATIONS

This application is a continuation of and claims priority under 35 U.S.C. § 120 from PCT Application No. PCT/EP2017/078118 filed on Nov. 3, 2017, which claims priority from German Application No. 10 2016 222 261.9, filed on Nov. 14, 2016. The entire contents of each of these priority applications are incorporated herein by reference.

TECHNICAL FIELD

The disclosure relates to methods for the additive manufacture of components in layers in a powder bed by at least two laser beams.

BACKGROUND

In machines for the additive manufacture of components in layers, materials are processed in that a powder layer (metal, ceramic, thermoplastic) is applied to a substrate plate in a process chamber and solidified with a laser beam. The materials can be reactive, such as titanium or aluminum for example, which oxidize rapidly in contact with oxygen, or comparatively inert, such as stainless steel for example. If the powder layer is melted by the laser beam, the manufacturing is called Laser Metal Fusion (LMF) or Selective Laser Melting (SLM). If the powder layer is only sintered by the laser beam, it is referred to as Selective Laser Sintering (SLS).

The substrate plate is then lowered by a powder layer thickness and a new powder layer is applied and again solidified, until a three-dimensional component has been manufactured. Usually, multiple laser beams with associated scanners are used to enlarge the possible installation space, which otherwise, in the case of a single scanner, would be restricted by its scanning range in X and Y, where overlapping working regions of the scanner are not ruled out (e.g. DE 10 2005 014 483 A1). According to EP 2 875 897 A1, the melting of the (surface) contour of the component in the overlapping region of the working regions of two laser beams is begun by one laser beam and then continued by the other scanner.

In addition, in methods for additive manufacture, the so-called sleeve-core strategy is known, in which, by using a first laser beam with a small focal diameter (e.g. <100 µm), the (very fine) contour of a component ("sleeve") is melted and, by using at least a second laser beam, the inner region of the component ("core") is melted in an accelerated manner as compared with the first laser beam, on the basis of a larger focal diameter (e.g. >500 µm) and therefore associated increased laser energy. Optionally, the region of the core is not melted after each powder layer; instead two or more powder layers are melted at once with the second laser beam. According to DE 198 18 469 A1, the diameter of the first laser beam can be 0.01 to 1.0 mm, or 0.1 to 0.3 mm, and the diameter of the second laser beam can be 0.3 to 50 mm, or 2 to 10 mm.

DE 10 2013 103 006 A1 discloses a machine for the additive manufacture of components in layers by multiple laser beams. The machine comprises a respective scanner for each laser beam for scanning the respective laser beams over a powder bed, and a carrier that can be lowered step-by-step to permit successive manufacturing layer cycles and to hold the powder bed. The laser beams are identical and can each scan the same powder bed region, so that each part of a component to be produced in this powder bed region can be manufactured by each of the laser beams. The laser focal spot of the laser beams that is projected onto the powder bed located in the focal plane has a diameter of usually about 70 µm. By the multiple overlapping laser beams, a larger common powder bed region is covered, so that different sections of a single component can be produced simultaneously and adjacent to one another by the laser beams. If, here, the laser beams are not calibrated exactly relative to one another or the laser beams are subject to different drifts over the manufacturing time, in the event of a surface contour that is produced jointly by the laser beams, this leads to an increase in the surface roughness, since the melt paths of the laser beams are offset relative to one another by this inaccuracy.

SUMMARY

This disclosure describes methods for additive manufacturing of components using two or more laser beams, but without any offset in the surface contour and with an accuracy that remains constant over the entire surface contour.

As described herein, each individual surface contour of the component to be produced in the powder bed region, the contour extending over multiple layers and being oriented perpendicularly or almost perpendicularly to the powder bed, and/or each individual surface contour of the component to be produced in the powder bed region, the contour extending over multiple layers and being oriented not parallel or not almost parallel to the powder bed, is manufactured solely by one of the laser beams. Each individual surface contour of the outer and/or the inner surface of the component, the contour extending over multiple layers and being oriented perpendicularly or almost perpendicularly to the powder bed, and/or each individual surface contour of the outer and/or inner surface of the component, the contour extending over multiple layers and being oriented not parallel or not almost parallel to the powder bed, is manufactured by a single one of the laser beams.

"Almost perpendicularly to the powder bed" is understood to mean a surface contour that encloses an angle of less than 20°, e.g., less than 10°, with the normal to the powder bed, and "not almost parallel to the powder bed" is understood to mean a surface contour that encloses an angle of less than 70° with the normal to the powder bed.

As described herein, each individual surface contour of the component is exposed to the same laser beam over all the layers of the surface contour, so that a calibration or drift error present between the different laser beams is insignificant. On account of their comparatively small laser focal spots, the laser beams are all suitable to produce the surface contours with the same surface quality. In other words, the laser focal spots of the laser beams that are projected onto the powder bed within the powder bed region each have an almost identical focal spot size or a focal spot size profile that is almost identical or symmetrical along the powder bed region. The size of the laser focal spot is understood to mean its maximum extent, that is to say the diameter in the case of a circular laser focal spot and the length of the longitudinal axis in the case of an elliptical laser focal spot.

Advantageously, at least one surface contour of the component to be produced in the powder bed region, the contour extending over multiple layers and being oriented parallel or almost parallel to the powder bed, can be manufactured with the same laser beam as a surface contour arranged adjacent thereto and oriented perpendicularly or almost perpendicularly to the powder bed. "Almost parallel to the powder bed" is understood to mean a surface contour that encloses an angle of greater than 70°, e.g., greater than 80°, with the normal to the powder bed.

Likewise advantageously, at least one surface contour of the component to be produced in the powder bed region, the contour extending over multiple layers and being oriented parallel or almost parallel to the powder bed, can be manufactured with the same laser beam as a surface contour arranged adjacent thereto and oriented not parallel or not almost parallel to the powder bed.

All the surface contours of the outer and/or inner surface of the component to be produced in the powder bed region, the contours extending over multiple layers and being oriented perpendicularly or almost perpendicularly to the powder bed, and/or all the surface contours of the component, the contours extending over multiple layers and being oriented not parallel or not almost parallel to the powder bed, are manufactured solely by a single one of the laser beams.

All the surface contours, the contours extending over multiple layers and being oriented perpendicularly or almost perpendicularly to the powder bed, and also all other surface contours of the component to be produced in the powder bed region being oriented not parallel or not almost parallel to the powder bed, are manufactured solely by a single one of the laser beams.

Multiple components to be manufactured in the powder bed region can each be manufactured simultaneously by different laser beams.

The powder bed region that can be scanned by the laser beams is formed by at least about ⅔ of the powder bed, e.g., by the entire powder bed.

The laser beams can either be produced by different laser sources or by a single laser source, wherein the single laser beam from the source is divided into individual laser beams by beam splitters. In the first case, the laser focal spots of the laser beams projected onto the powder bed can be of different sizes, while in the second case they are the same size or at least almost the same size.

Advantageously, simultaneously with the manufacture of the surface contour, an internal region of the component is manufactured by another of the laser beams, which is expedient when the other laser beam cannot simultaneously manufacture its own component. The exposure of the surface contour and the exposure of the inner region of the component by the other laser beam, is typically carried out in a mutually overlapping manner, specifically at least within the order of magnitude of the calibration errors or drifts between the laser beams.

The disclosure also relates to computer program products that have code adapted to perform all the steps of the above-described method when the program is run on a machine control system of a machine.

Further advantages and advantageous refinements of the subject matter of the invention can be gathered from the description, the claims, and the drawing. Likewise, the features mentioned above and those still to be explained can each be used on their own or in multiples in any desired combinations. The embodiments shown and described are not to be understood as a final enumeration, but instead serve as examples of the invention.

DETAILED DESCRIPTION

Figure 1:
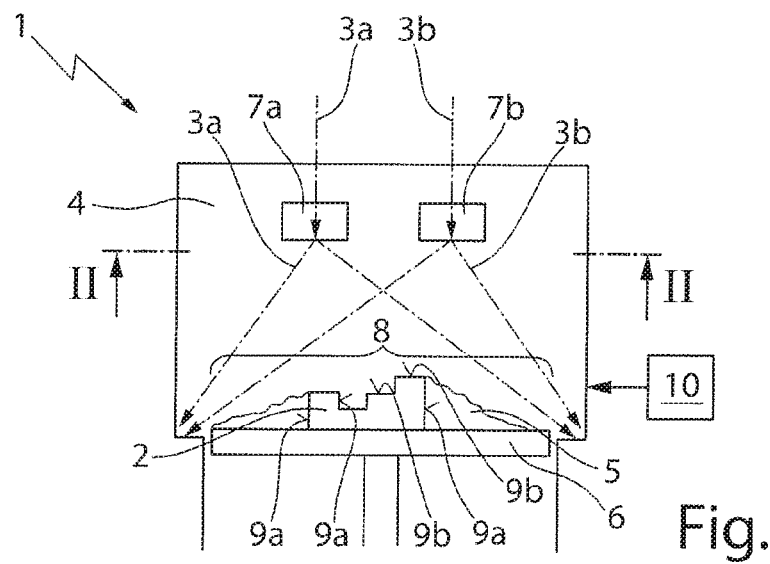
FIG. 1 shows, schematically, a Laser Metal Fusion (LMF) machine for the additive manufacture of components in layers.
Figure 2:
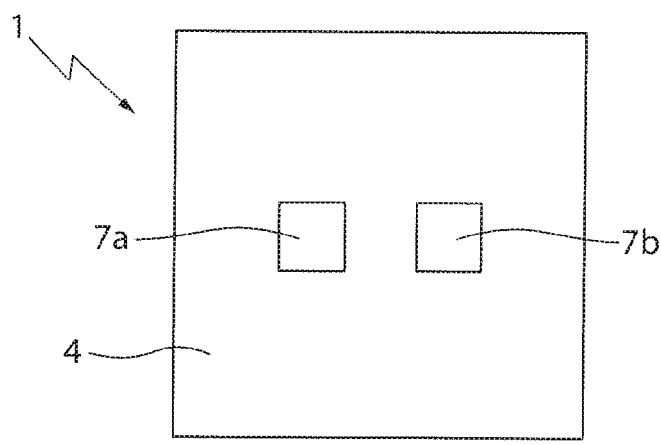
FIG. 2 shows a sectional view through the LMF machine shown in FIG. 1 along line II-II in FIG. 1.

The LMF machine 1 shown in FIG. 1 serves for the additive manufacture of components 2 in layers by two laser beams 3a, 3b. The LMF machine 1 includes a process chamber 4, in which a powder layer (metal, ceramic, thermoplastic) is applied to a substrate plate 6 to create a powder bed 5 that can be melted with the laser beams 3a, 3b and solidified as a result. The substrate plate 6 is then lowered by a powder layer thickness and a new powder layer is applied and again solidified. This process is repeated until a three-dimensional component 2 has been manufactured.

Above the powder bed 5 is a first scanner 7a for the two-dimensional deflection of one laser beam 3a over a first powder bed section, and a second scanner 7b for the two-dimensional deflection of the second laser beam 3b over a second powder bed section. The two powder bed sections overlap. As indicated by the dash-dotted lines in FIG. 1, in the exemplary embodiment shown, the entire powder bed 5 can be scanned respectively by both of the laser beams 3a, 3b above the substrate plate 6, so that a powder bed region 8 that can be scanned by both laser beams 3a, 3b is formed on the entire powder bed 5.

The laser focal spots of the laser beams 3a, 3b projected onto the powder bed 5 are set or can be set to a size less than or equal to 300 µm, e.g., 200 µm, or 100 µm. The shape and size of the laser focal spots are substantially but not exactly constant over the powder bed 5. If the laser beam 3a, 3b on the powder bed 5 is moved away from a point of impingement directly underneath its scanner 7a, 7b, it changes in shape and size, becomes oval and expands in size, and the power density is reduced. By virtue of their lower laser focal spot sizes, both laser beams 3a, 3b are equally suitable to produce a component 2 with the same surface roughness (surface quality). Advantageously, the two laser beams 3a, 3b each have a focal spot size that is almost identical within the powder bed region 8 or a focal spot size profile that is almost identical or symmetrical along the powder bed region 8.

In previously known manufacturing methods, following calibration of the two laser beams 3a, 3b on their own and relative to each other, a surface contour 9a of a component 2, wherein the contour extends over multiple layers and is oriented perpendicularly or almost perpendicularly to the powder bed 5, is manufactured jointly by both laser beams 3a, 3b. Therefore, in the event of calibration errors or drifts of the laser beams, the surface roughness of the component increases. According to the present disclosure, each individual surface contour 9a extending over multiple layers (and should be understood as being oriented perpendicularly or almost perpendicularly to the powder bed 5) is manufactured by only one of the two laser beams 3a, 3b. All the surface contours of the outer and/or inner surface of the component 2 are manufactured solely by one of the laser beams 3a, 3b. This results in a surface roughness that remains constant on the surface contour 9a and provides improved dimensional stability, because of more accurate positioning of the surface contours 9a relative to each other. Advantageously, all the surface contours 9a, and also all the other surface contours 9b of the component 2 that are oriented not perpendicularly or not almost perpendicularly to the powder bed 5, are manufactured solely by one of the laser beams 3a, 3b in the powder bed region 8.

Simultaneously with the manufacture by the one laser beam of the surface contour 9a of the component 2, an inner region of this component 2 can be manufactured by the other laser beam. Multiple components to be manufactured in the same powder bed 5, in the powder bed region 8, can be manufactured simultaneously and independently of one another by the two laser beams 3a, 3b. The exposure of the surface contour 9a and the exposure of the inner region of the component 2 by the other laser beam, is typically carried out in a mutually overlapping manner, specifically in the order of magnitude of the calibration errors or drifts between the laser beams.

As shown in FIG. 1, the machine 1 also includes a machine control system 10 programmed to control the above-described method for the additive manufacture of components in layers.

As already explained above, a component 2 can have multiple surface contours 9a oriented perpendicularly or almost perpendicularly to the powder bed 5, as is illustrated by the following examples:

1. A sphere, which is hollow inside, has a surface contour 9a as the outer sphere surface, and a further surface contour 9a as the inner sphere surface.

2. A tube formed vertically in the powder bed likewise has two surface contours 9a, oriented perpendicularly to the powder bed 5, which represents the outer side of the tube. It further has a surface contour oriented perpendicularly to the powder bed 5, which represents the inner side of the tube. The outer and inner side are connected via an internal region of the component. Surfaces oriented substantially parallel to the powder bed, tube end faces in this example, are not viewed as surface contours that are to be manufactured solely by one of the lasers to reduce a surface roughness as a result of calibration errors or drifts between the laser beams. In this case, the exposure of the surface contours 9a and of the inner region 9b of the component 2, if the exposures are carried out by different laser beams, are typically carried out in a mutually overlapping manner, specifically at least in the order of magnitude of the calibration errors or drifts between the laser beams involved. However, it is optionally possible to manufacture all the surface contours 9a, the contours being oriented perpendicularly or almost perpendicularly to the powder bed 5, and all other surface contours 9b of the component 2 to be produced in the powder bed region 8, that is to say oriented not perpendicularly or not almost perpendicularly to the powder bed, solely by one of the laser beams 3a, 3b. In this case, an improved surface quality can be achieved in a simple manner even in the case of surfaces that are oriented substantially parallel to the powder bed.

Figure 3:
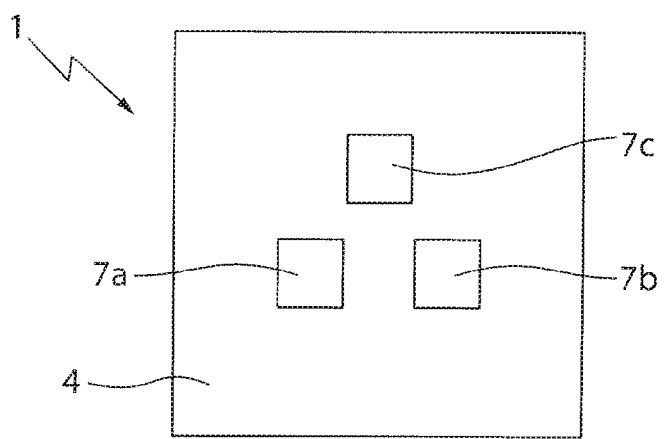
FIG. 3 shows a modified LMF machine for the additive manufacture of components in layers in a sectional view analogous to FIG. 2.

Instead of the two laser beams 3a, 3b shown in FIG. 1, the machine 1 can also have three or more laser beams that scan an identical powder bed region. FIG. 3 shows a machine 1 having three scanners 7a, 7b, 7c for the two-dimensional deflection of three laser beams, wherein the three scanners 7a-7c are arranged at the corner points of a regular triangle above the center of the powder bed 5.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for the additive manufacture of a component to be produced in layers in a powder bed, the method comprising:
   directing at least two laser beams by at least two respective laser scanners to a region of the powder bed to impinge from above onto a top surface of the powder bed, wherein the at least two laser beams are each deflected two-dimensionally over the powder bed region and wherein a laser spot of each laser beam is projected onto the powder bed below the corresponding scanner, and the at least two laser spots on the top surface of the powder each have the same or almost the same spot diameter of less than or equal to 300 µm so that all of the at least two laser beams are equally suitable to produce the component with a same surface roughness; and
   manufacturing the component in the powder bed with the at least two laser beams, wherein a surface contour of the component can be manufactured by either one of the at least two laser beams with the same surface roughness, wherein all surface contours of an outer surface of the component are manufactured solely by a first of the at least two laser beams, and wherein an internal region of the component is manufactured by a second of the at least two laser beams.

2. The method of claim 1, wherein the laser spot diameter of each one of the at least two laser beams is less than or equal to 200 µm.

3. The method of claim 1, wherein the laser spot diameter of each one of the at least two laser beams is less than or equal to 100 µm.

4. The method of claim 1, wherein at least one surface contour, which extends over multiple layers and is oriented parallel or almost parallel to the powder bed, is manufactured with the same laser beam as a surface contour oriented perpendicular or almost perpendicular to the powder bed.

5. The method of claim 1, wherein at least one surface contour, which extends over multiple layers and is oriented parallel or almost parallel to the powder bed, is manufactured with the same laser beam as a surface contour not oriented parallel or almost parallel to the powder bed.

6. The method of claim 1, wherein all the surface contours of an outer surface, an inner surface, or both an inner surface and an outer surface of the component are manufactured solely by one of the laser beams.

7. The method of claim 1, wherein all the surface contours of the component are manufactured solely by one of the laser beams.

8. The method of claim 1, wherein all the surface contours extending over multiple layers and oriented perpendicular or almost perpendicular to the powder bed, and all other surface contours not oriented parallel or almost parallel to the powder bed are manufactured solely by one of the laser beams.

9. The method of claim 1, wherein multiple components to be manufactured in the powder bed region are each manufactured simultaneously by different laser beams.

10. The method of claim 1, wherein the powder bed region that can be scanned by each of the laser beams includes at least about ⅔ of the powder bed.

11. The method of claim 1, wherein the powder bed region that can be scanned by each of the laser beams includes the entire powder bed.

12. The method of claim 1, wherein the manufacture of the surface contour is simultaneous with the manufacture of the internal region of the component.

13. A computer program product that has code adapted to perform steps for a method for the additive manufacture of a component to be produced in layers in a powder bed when the program is run on a machine control system of a machine, the method comprising:

directing at least two laser beams by two respective laser scanners to a powder bed to impinge from above onto the powder bed directly below the corresponding scanner, wherein the at least two laser beams are deflected two-dimensionally over the powder bed and wherein laser spots of the at least two laser beams projected onto a top surface of the power bed each have the same or almost the same spot diameter of less than or equal to 300 µm so that all of the at least two laser beams are equally suitable to produce the component with a same surface roughness; and manufacturing the component in the powder bed with the at least two laser beams, wherein a surface contour of the component can be manufactured by either one of the at least two laser beams with the same surface roughness, wherein all surface contours of an outer surface of the component are manufactured solely by a first of the at least two laser beams, and wherein an internal region of the component is manufactured by a second of the at least two laser beams.

14. A method for the additive manufacture of a component to be produced in layers in a powder bed, the method comprising:

directing at least two laser beams by two respective laser scanners to a powder bed to impinge from above onto a top surface of the powder bed directly below the corresponding scanner, wherein the at least two laser beams are each deflected two-dimensionally over the powder bed and wherein laser spots of the at least two laser beams projected onto the top surface of the powder bed each have the same or almost the same spot diameter of less than or equal to 200 µm so that all of the at least two laser beams are equally suitable to produce the component with a same surface roughness; and manufacturing the component in the powder bed with the at least two laser beams, wherein a surface contour of the component can be manufactured by either one of the laser beams with the same surface roughness, wherein all surface contours of the outer and inner surfaces of the component are manufactured solely by a first of the at least two laser beams, and wherein an internal region of the component is manufactured by a second of the at least two laser beams.

15. A method for the additive manufacture of multiple components to be produced in layers in a powder bed, the method comprising:

directing at least two laser beams by at least two respective laser scanners to a region of the powder bed to impinge from above onto a top surface of the powder bed, wherein the at least two laser beams are each deflected two-dimensionally over the powder bed region and wherein a laser spot of each laser beam is projected onto the top surface of the powder bed below the corresponding scanner, and the at least two laser spots each have the same or almost the same spot diameter of less than or equal to 300 µm so that all of the at least two laser beams are equally suitable to produce the components with a same surface roughness; and manufacturing the multiple components in the powder bed simultaneously by the at least two laser beams, wherein a surface contour of the components can be manufactured by either one of the laser beams with the same surface roughness, wherein all surface contours of an outer surface of at least one of the components are manufactured solely by a first of the at least two laser beams, and wherein an internal region of the at least one of the components is manufactured by a second of the at least two laser beams.

* * * * *